United States Patent [19]
Estes et al.

[11] Patent Number: 4,941,829
[45] Date of Patent: Jul. 17, 1990

[54] METHOD FOR PROVIDING A DYNAMIC TUTORIAL DISPLAY

[75] Inventors: Mark W. Estes, Dallas; Ivan R. Eisen, Flower Mound; Anthony M. Peters, Bedford, all of Tex.

[73] Assignee: International Business Machines Corporation, Armonk, N.Y.

[21] Appl. No.: 137,399

[22] Filed: Dec. 23, 1987

[51] Int. Cl.$^5$ ............................................. G09B 19/00
[52] U.S. Cl. ..................................... 434/118; 434/335
[58] Field of Search ................................. 434/118, 335

[56] References Cited

U.S. PATENT DOCUMENTS

| | | | |
|---|---|---|---|
| 4,622,013 | 11/1986 | Cerchio | 434/118 |
| 4,637,797 | 1/1987 | Whitney et al. | 434/118 |
| 4,701,130 | 10/1987 | Whitney et al. | 434/118 |
| 4,772,206 | 9/1988 | Kerr et al. | 434/118 |

Primary Examiner—Leo P. Picard
Assistant Examiner—Jessica Harrison
Attorney, Agent, or Firm—Andrew J. Dillon

[57] ABSTRACT

A method is disclosed for providing a dynamic tutorial display for assisting a computer operator in the utilization of a selected interactive software application. A tutorial processing program is provided and is resident between the operating system and a selected interactive software application, acting as a filter therebetween. A sequence of desired operator inputs, such as keystrokes or mouse movements, is recorded by the tutorial processing program along with an indication of the elapsed time between each input. In response to an operator request for assistance, the tutorial processing program couples each recorded input in a selected sequence to the interactive software application, in sequence in accordance with the recorded elapsed time indications. In practice, the software application will then respond in a manner identical to the response generated by human inputs. In a preferred embodiment of the present invention, the tutorial processing program also includes a provision for recording a plurality of textual or audible descriptive elements within the sequence of operator inputs.

12 Claims, 2 Drawing Sheets

METHOD FOR PROVIDING A DYNAMIC TUTORIAL DISPLAY

BACKGROUND OF THE INVENTION

1. Technical Field:

This invention relates in general to methods for training or assisting a computer operator in the utilization of an interactive software application and, in particular to methods for training or assisting a computer operator in the utilization of an interactive software application which utilize a dynamic display.

2. Background Art:

The advent of increasingly powerful computer systems and a concomitant increase in the complexity of available software applications have increased dramatically the need for effective methods of training or assisting operators of these systems. One effective method for training operators in the utilization of these systems is the so-called "on-line" tutorial. This approach is favored due to the fact that the operator does not have to constantly shift his or her attention between a manual and the display terminal. Additionally, it is possible to implement a self-paced instruction system utilizing an on-line tutorial, eliminating the necessity of a human instructor.

Known on-line tutorial systems generally utilize one of three established approaches. The simplest approach is the on-line documentation approach. This technique merely displays textual documentation utilizing the display terminal. In addition to the relatively high utilization of storage involved, the on-line documentation approach is not significantly more effective than a manual in training an operator to utilize an interactive software application.

A second approach utilized is the so-called "snapshot" approach in which an operator is presented with a series of static displays of selected application screens with on-line documentation. While an improvement over simple on-line documentation systems, this approach also fails to provide an operator with the feeling of interaction necessary to become familiar with complex interactive applications. Additionally, the storage requirement necessary to provide multiple full screens of information is quite high.

A final approach to on-line tutorials is an interactive approach which has been customized for a particular application. This approach requires extensive preprogramming for each application and involves the provision of a staged sequence of activity with resultant screen displays provided. While an improvement over the previously enumerated approaches, this technique is not particularly valid for utilization with recent applications which utilize pulldown menus and a mouse or other graphic input or pointing devices. The movement of a pointing device is not easily simulated with known on-line tutorial approaches. Therefore, it should be obvious that a need exists for an on-line tutorial method which will provide an operator with an interactive experience which thoroughly demonstrates the various activities of a software application.

SUMMARY OF THE INVENTION

It is therefore one object of the present invention to provide an improved on-line tutorial method.

It is another object of the present invention to provide an improved on-line tutorial method which provides an operator with a demonstration of an interactive experience.

It is yet another object of the present invention to provide an improved on-line tutorial method which can be simply and easily utilized with a selected interactive software application without the necessity for extensive preprogramming.

The foregoing objects are achieved as is now described. The method of the present invention provides a dynamic tutorial display for assisting a computer operator in the utilization of a selected interactive software application. A tutorial processing program is provided which is resident between the operating system and a selected interactive software application, acting as a filter therebetween. A sequence of selected operator inputs, such as keystrokes or mouse movements, is recorded by the tutorial processing program along with an indication of the elapsed time between each successive input. In response to an operator request for assistance, the tutorial processing program couples a selected sequence of recorded operator inputs to the interactive software application in sequence in accordance with the recorded elapsed time indicators. In practice, the software application will then respond in a manner identical to the response generated by human input from an experienced operator. In a preferred embodiment of the present invention the tutorial processing program also includes a provision for recording a plurality of textual or audible descriptive elements within the sequence of operator inputs.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
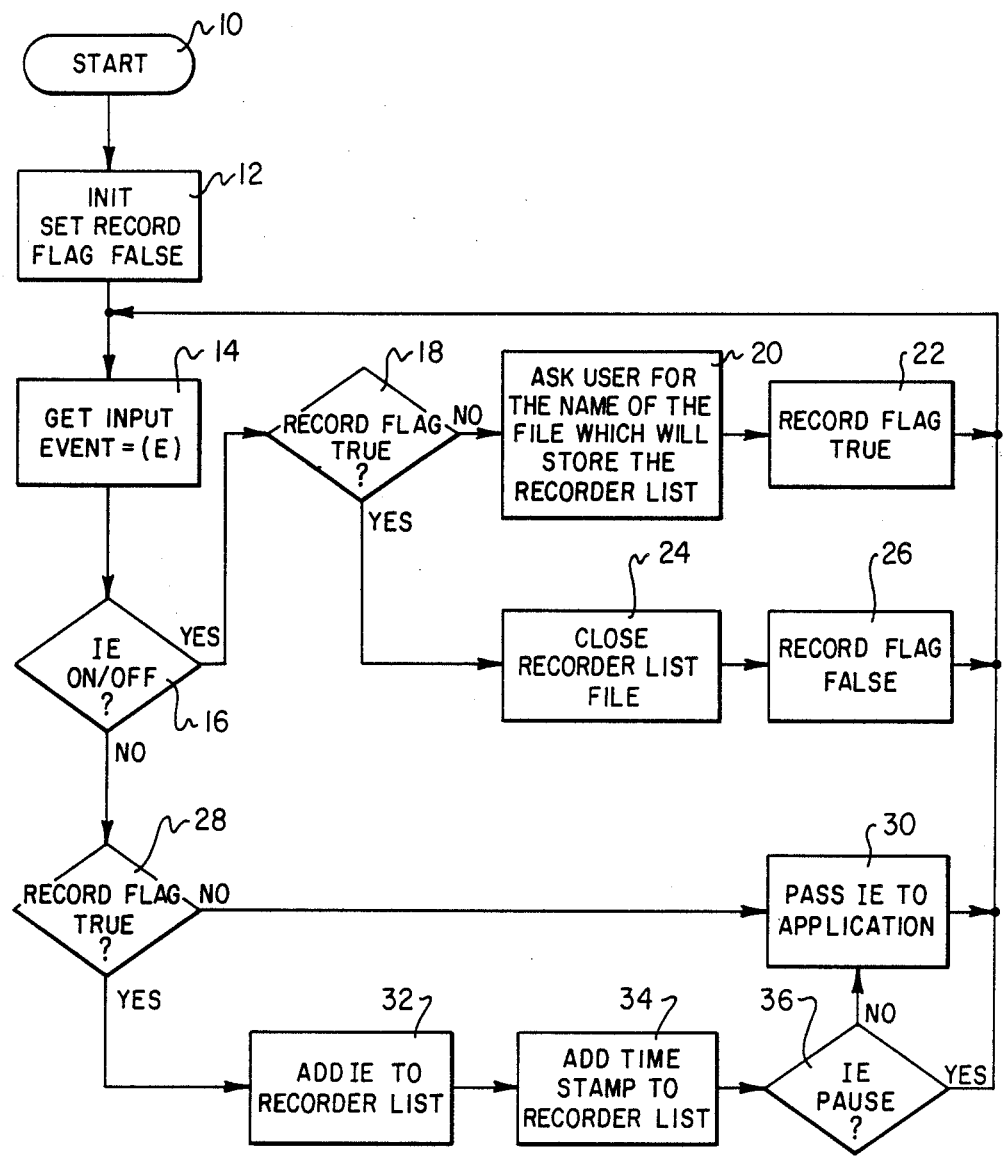
FIG. 1 is a flow diagram of the operation of the recording element of the tutorial method of the present invention.

With reference now to the figures and in particular with reference to FIG. 1 there is depicted a flow diagram of the operation of the record element of the tutorial method of the present invention. In the flow diagram, the graphical conventions of a diamond for a test or decision and a rectangle for a process or function are observed. These conventions are well understood by programmers skilled in the art, and the flow diagram is sufficient to enable a programmer of ordinary skill to write code in any suitable computer programming language, such as BASIC, PASCAL, or C for a computer, such as the IBM Personal Series/2 (PS/2) family of computers which supports those languages.

After starting and initializing the system the tutorial processing program of the present invention sets an indicator referred to as a "Record Flag" to a condition designated "FALSE", as indicated in blocks 10 and 12. Thereafter, the tutorial processing program of the present invention filters each user initiated event, such as a keyboard entry or mouse movement. Each of these user initiated events is referred to herein as a "Input Event" or "IE". In the depicted embodiment of the present invention, the tutorial processing program recognizes two special Input Events. These events are the RECORD ON/OFF command and the RECORD PAUSE. These two commands are of special significance to the tutorial processing program and are preferably implemented utilizing a special sequence of keystrokes which will not be recognized by the software application which is being utilized. In a preferred embodiment of the present invention, these commands may be selectively altered to ensure there are no conflicts with commands which are recognized by the software application utilized.

After receiving an Input Event, as indicated in block 14, decision block 16 is utilized to determine whether or not the Input Event is the RECORD ON/OFF command, as indicated in decision block 16. If so, the tutorial processing program checks to determine whether or not the Record Flag has been set TRUE, as depicted in decision block 18.

If the Record Flag has not been set TRUE, the tutorial processing program prompts the operator for the name of a file which will be utilized to store the sequence of Input Events for tutorial purposes. This activity is represented by block 20. Thereafter, the Record Flag is set TRUE as indicated by block 22 and the program returns to scan for a subsequent Input Event. In the event that the Record Flag is set TRUE, indicating that a recording sequence has occurred, decision block 18 will be effective to close the file containing the recorded sequence of Input Events, as depicted in block 24. Next, the Record Flag is set equal to FALSE, as indicated in block 26, and the tutorial processing program returns to scan for a subsequent Input Event. In this manner, the RECORD ON/OFF command may be utilized to "toggle" the state of the Record Flag, turning the recording sequence on and off.

Returning now to decision block 16, if a detected Input Event is not a RECORD ON/OFF command, the tutorial processing program checks to determine whether the Record Flag has been set TRUE, as indicated by decision block 28. If the record function is not active, the Input Event is coupled to the interactive software application being utilized, as indicated by block 30. However, if the Record Flag has been set TRUE, the specific Input Event detected is added to the store of recorded Input Events, as depicted in block 32. Next, a time stamp is associated with the recorded Input Event to determine the elapsed time between that Input Event and the previous Input Event. Finally, decision block 36 is utilized to determine whether or not the Input Event is a RECORD PAUSE command. If not, the Input Event thus recorded is passed to the interactive software application, as depicted in block 30. If the Input Event is a RECORD PAUSE command the tutorial processing program returns to scan for additional Input Events after recording a descriptive element for utilization during playback, as illustrated in block 37. Those skilled in the art will appreciate that many means exist for recording either a textual or audible description and that such descriptions may then be interspersed among the recorded sequence of Input Events to provide additional documentation for the operator during the tutorial.

Figure 2:
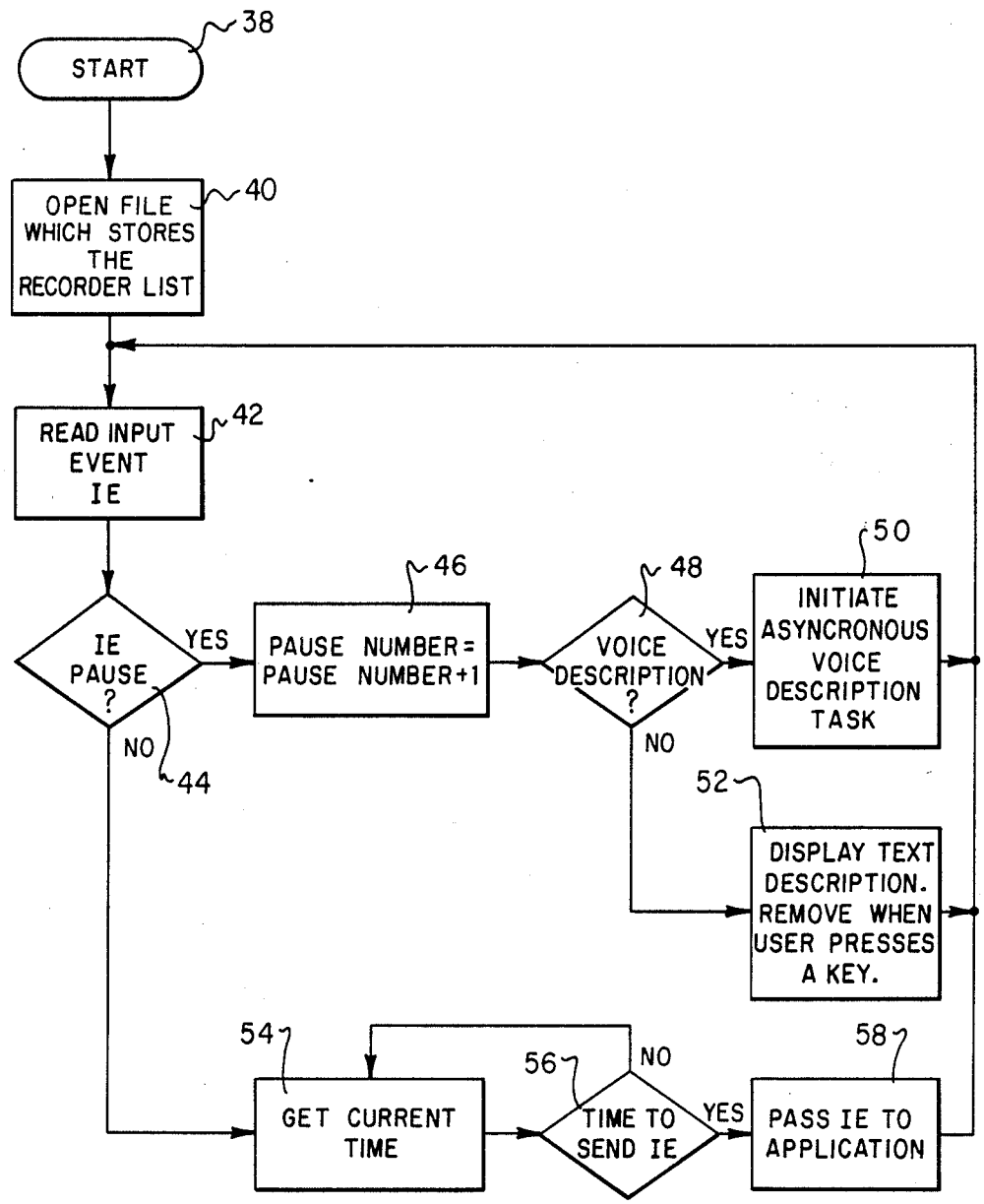
FIG. 2 is a flow diagram showing the operation of the playback element of the tutorial method of the present invention.

Referring now to FIG. 2, there is depicted a flow chart of the operation of the playback element of the tutorial processing program of the present invention. The playback element is selected each time the operator requests assistance or calls up a tutorial. Those skilled in the art will appreciate that there are many ways for an operator to request assistance in the utilization of an interactive software application, i.e., the utilization of specific function keys, context sensitive words and tokens or as an element in a selection list of a menu. However selected, the request for operator assistance or a tutorial begun in block 38 will open the storage file which has been utilized to store the specific sequence of Input Events which is most illustrative of the type of assistance required by the operator. This operation is depicted in block 40. Next, the tutorial processing program reads the Input Event, as indicated in block 42, and determines whether or not the Input Event is a RECORD PAUSE, as indicated in decision block 44.

If the Input Event is not a RECORD PAUSE, the tutorial processing program of the present invention determines the current time, as indicated in block 54, and then determines whether or not is the correct time to couple the Input Event to the application, as indicated in decision block 56. If not, a loop back to block 54 is utilized to determine the current time. When the proper time has occurred, decision block 56 is effective to cause the Input Event to be passed to the interactive software application, as indicated in block 58. Thereafter, of course, the interactive software application will react in a manner similar to the reaction which will occur if a human operator had caused the Input Event to occur.

Returning now to decision block 44, if the Input Event read from storage is RECORD PAUSE, block 46 is then utilized to increment a number associated with the RECORD PAUSE command. Next, decision block 48 is utilized to determine whether or not the RECORD PAUSE command retrieved from memory requires a voice description. If so, block 50 is utilized to initiate an asynchronous voice description task which has been stored in any manner well known in the art. Thereafter, the tutorial processing program of the present invention returns to the stored sequence of Input Events and reads the next Input Event.

If decision block 48 determines that a voice description is not required, block 52 is effected to display a textual description which will remain in display until such time as the operator indicates it is no longer required, by the utilization of a selected key, for example. Thereafter, block 52 returns the tutorial processing program to the stored sequence of Input Events for retrieval of the next Input Event.

In the manner described herein, those skilled in the art will appreciate that the tutorial method of the present invention provides a simple and straight forward method for providing the operator with an interactive demonstration utilizing a dynamic tutorial display. This method may be simply and easily utilized with any interactive software application and requires no extensive preprogramming or training to generate tutorial demonstrations.

While the invention has been particularly shown and described with reference to a preferred embodiment, it will be understood by those skilled in the art that various changes in form and detail may be made therein without departing from the spirit and scope of the invention.

We claim:

1. A method in a data processing system for training a computer operator in the utilization of an interactive software application, comprising the steps of;
   storing a correct sequence of operator inputs to a selected interactive software application, prior to training an operator in the utilization of said selected interactive software application;
   permitting said operator to utilize said selected interactive software application;
   detecting an operator request for assistance;
   determining a selected portion of said stored sequence of operator inputs which is illustrative of the type of assistance requested by the operator; and
   coupling said selected portion of said stored sequence of operator inputs to said selected interactive software application in a sequential manner.

2. The method in a data processing system for training a computer operator in the utilization of an interactive software application according to claim 1 further including the step of storing an indication of the elapsed time between each of said operator inputs.

3. The method in a data processing system for training a computer operator in the utilization of an interactive software application according to claim 14 wherein said step of coupling said selected portion of said stored sequence of operator inputs to said selected interactive software application in a sequential manner is accomplished in accordance with said stored indication of elapsed time.

4. The method in a data processing system for training a computer operator in the utilization of an interactive software application according to claim 1 further including the step of storing at least one descriptive element within said sequence of operator inputs.

5. The method in a data processing system for training a computer operator in the utilization of an interactive software application according to claim 4 wherein said step of storing at least one descriptive element within said sequence of operator inputs is further characterized as storing at least one textual descriptive element within said sequence of operator inputs.

6. The method in a data processing system for training a computer operator in the utilization of an interactive software application according to claim 4 wherein said step of storing at least one descriptive element within said sequence of operator inputs is further characterized as storing at least one audible descriptive element within said sequence of operator inputs.

7. A method in a data processing system for providing a dynamic tutorial display for assisting a computer operator in the utilization of a selected interactive software application comprising the steps of;
   providing a tutorial processing resident between an operating system and a selected interactive software application;
   storing a correct sequence of operator inputs to said interactive software application utilizing said tutorial processing program;
   permitting said operator to utilize said selected interactive software application;
   detecting an operator request for assistance;
   determining a selected portion of said stored sequence of operator inputs which is illustrative of the type of assistance requested by said operator; and
   coupling said selected portion of said stored sequence of operator inputs to said selected interactive software application in a sequential manner.

8. The method in a data processing system for providing a dynamic tutorial display for assisting a computer operator in the utilization of a selected interactive software application according to claim 7 further including the step of storing an indication of the elapsed time between each of said operator inputs.

9. The method in a data processing system for providing a dynamic tutorial display for assisting a computer operator in the utilization of a selected interactive software application according to claim 8 wherein said step of coupling said selected portion of said stored sequence of operator inputs to said selected interactive software application in a sequential manner is accomplished in accordance with said stored indication of elapsed time.

10. The method in a data processing system for providing a dynamic tutorial display for assisting a computer operator in the utilization of a selected interactive software application according to claim 7 further including the step of storing at least one descriptive element within said sequence of operator inputs.

11. The method in a data processing system for providing a dynamic tutorial display for assisting a computer operator in the utilization of a selected interactive software application according to claim 10 wherein said step of storing at least one descriptive element within said sequence of operator inputs is further characterized as storing at least one textual descriptive element within said sequence of operator inputs.

12. The method in a data processing system for providing a dynamic tutorial display for assisting a computer operator in the utilization of a selected interactive software application according to claim 10 wherein said step of storing at least one descriptive element within said sequence of operator inputs in further characterized as storing at least one audible descriptive element within said sequence of operator inputs.

* * * * *